United States Patent
Tanaka et al.

(10) Patent No.: US 10,080,207 B2
(45) Date of Patent: Sep. 18, 2018

(54) AUDIO DEVICE, AUDIO SYSTEM, AND SYNCHRONOUS REPRODUCTION METHOD

(71) Applicant: YAMAHA CORPORATION, Hamamatsu-shi (JP)

(72) Inventors: Katsuaki Tanaka, Hamamatsu (JP); Hisashi Iida, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/686,556

(22) Filed: Aug. 25, 2017

(65) Prior Publication Data

US 2017/0353937 A1    Dec. 7, 2017

Related U.S. Application Data

(63) Continuation of application No. PCT/JP2016/067608, filed on Jun. 14, 2016.

(30) Foreign Application Priority Data

Jun. 16, 2015 (JP) ................................. 2015-121467

(51) Int. Cl.
*H04W 56/00* (2009.01)
*H04H 20/18* (2008.01)

(52) U.S. Cl.
CPC ........ *H04W 56/0015* (2013.01); *H04H 20/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,676,044 | B2* | 3/2010 | Sasaki | H04S 7/302 381/303 |
| 2002/0118616 | A1* | 8/2002 | Fujiwara | G11B 20/10527 369/47.29 |
| 2005/0152557 | A1* | 7/2005 | Sasaki | H04S 7/302 381/58 |
| 2007/0085575 | A1* | 4/2007 | Cooper | H04N 5/04 327/108 |
| 2010/0142721 | A1* | 6/2010 | Wada | H04R 3/005 381/77 |
| 2012/0288124 | A1* | 11/2012 | Fejzo | H04R 5/02 381/303 |
| 2013/0182147 | A1* | 7/2013 | Kimoto | H04N 5/77 348/231.4 |
| 2016/0314803 | A1* | 10/2016 | Stone | G10L 25/48 |

OTHER PUBLICATIONS

JP 2011066544 Translation, Jujimoto, T., Mar. 31, 2011.*

* cited by examiner

*Primary Examiner* — Nay A Maung
*Assistant Examiner* — Erica Fleming-Hall
(74) *Attorney, Agent, or Firm* — Rossi, Kimms & McDowell LLP

(57) ABSTRACT

An audio device includes a signal input interface, a first output interface, a second output interface, at least one processing circuit configured as a buffer control portion, at least one memory configured to store an audio signal. The buffer control portion sets a second reading position at a position that precedes a first reading position of the first output interface by delay time, and, when starting output of the audio signal, writes silent data for the delay time in the memory and sets the first reading position at the head of the silent data.

5 Claims, 6 Drawing Sheets

AUDIO DEVICE, AUDIO SYSTEM, AND SYNCHRONOUS REPRODUCTION METHOD

CROSS REFERENCE TO RELATED APPLICATIONS

The present application is a continuation application of International Patent Application No. PCT/JP2016/067608, filed on Jun. 14, 2016, which claims priority to Japanese Patent Application No. 2015-121467, filed on Jun. 16, 2015. The contents of these applications are incorporated herein by reference in their entirety.

BACKGROUND OF THE INVENTION

1. Field of the Invention

Some preferred embodiments of the present invention relate to an audio device, an audio system, and a synchronous reproduction method that enable a plurality of devices to synchronously reproduce an audio signal.

2. Description of the Related Art

Conventionally, a system in which an audio signal that has been reproduced by a master audio device is reproduced by other audio devices has been proposed (see Japanese Unexamined Patent Application Publication No. 2006-074374, for example). In such a case, audio signals may be transmitted from the master audio device to other audio devices by respective different transmission ways.

For example, a master audio device and other audio devices may be unable to reproduce an audio signal synchronously due to a difference in performance of each of the transmission ways (for example, a difference between wireless transmission and wired transmission).

SUMMARY OF THE INVENTION

In view of the foregoing, some preferred embodiments of the present invention are directed to make it possible to reproduce an audio signal synchronously by a plurality of audio devices.

An audio device according to some preferred embodiments of the present invention includes: a signal input interface configured to input an audio signal; a first output interface; a second output interface; at least one processing circuit configured as a buffer control portion; and at least one memory configured to store the audio signal and instructions that, when executed by the at least one processing circuit. The buffer control portion sets a first reading position being a reading position of the audio signal stored in the memory with respect to the first output interface, and a second reading position being a reading position of the audio signal stored in the memory with respect to the second output interface and being a position that precedes the first reading position by delay time. And the buffer control portion, when starting output of the audio signal, writes silent data for the delay time in the memory with respect to the first output interface and sets the first reading position at a head of the silent data.

Alternatively, an audio device according to some preferred embodiments of the present invention includes: a signal input interface configured to input an audio signal; a first output interface; a second output interface; at least one processing circuit configured as a buffer control portion; and at least one memory configured to store the audio signal and instructions that, when executed by the at least one processing circuit. The buffer control portion sets a first reading position being a reading position of the audio signal stored in the memory with respect to the first output interface, a second reading position being a reading position of the audio signal stored in the memory with respect to the second output interface, and a minimum buffer position being a most preceding position of the audio signal in the memory; and, in a case in which, in a middle of reading the audio signal from the memory to the first output interface, the audio signal is newly read from the memory to the second output interface, when a buffer amount of the memory is equal to or more than delay time, the buffer control portion sets the second reading position at a position that precedes the first reading position by the delay time, and, when the buffer amount of the memory is less than the delay time, the buffer control portion sets the second reading position at the minimum buffer position, moves the first reading position to a position that goes back from the minimum buffer position by the delay time, and writes silent data for time of movement from the first reading position before the movement to the first reading position after the movement.

An audio device according to some preferred embodiments of the present invention is capable of reproducing an audio signal synchronously by a plurality of audio devices.

The above and other elements, features, characteristics, and advantages of the present invention will become more apparent from the following detailed description of the preferred embodiments with reference to the attached drawings.

DETAILED DESCRIPTION OF THE PREFERRED EMBODIMENTS

Figure 1:
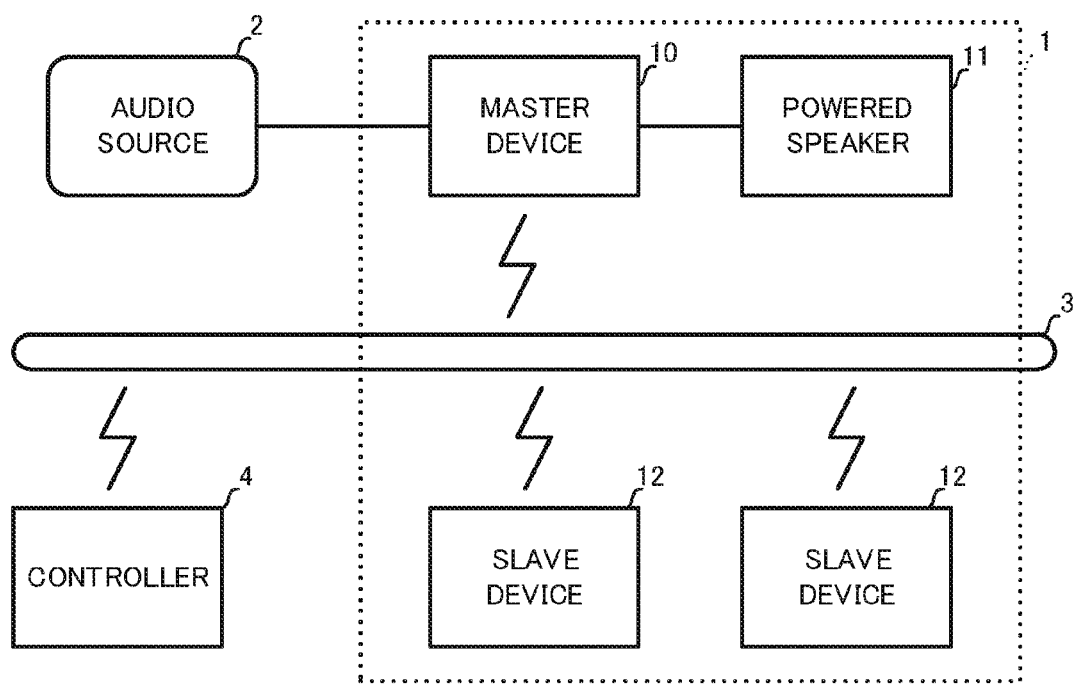
FIG. 1 is a configuration diagram of an audio system according to a preferred embodiment of the present invention.
Figure 2:
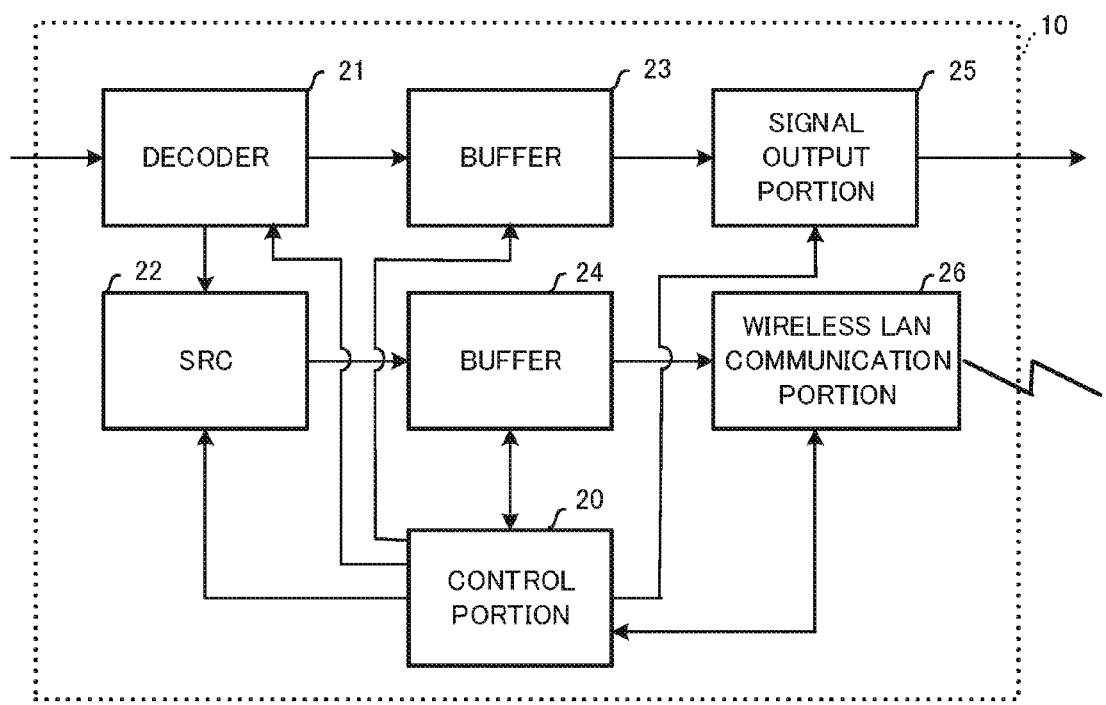
FIG. 2 is a block diagram of a master device of the audio system.

FIG. 1 is a configuration diagram of an audio system 1 according to a preferred embodiment of the present invention. FIG. 2 is a block diagram of a master device 10.

An audio system 1 has a master device 10, a powered speaker 11 (a first reproducing device), and one or more slave devices 12 (a second reproducing device). The master device 10 and the slave devices 12 are controlled by a controller 4 through a network 3. The master device 10 and the slave devices 12 are grouped. An audio signal that has been reproduced by the master device 10 is synchronized and emitted also by the slave devices 12.

An audio source 2 is supplied to the master device 10. The master device 10 is a receiver, for example, and amplifies an input audio source 2 and outputs the input audio source 2 to the powered speaker 11. The master device 10 and the powered speaker 11 are connected to each other by a digital cable or the like and are able to transmit a high quality digital signal. The powered speaker 11 inputs a high quality audio signal, and decodes and analog converts the audio signal to amplify and emit the audio signal. The slave devices 12 are each a wireless speaker, for example. The slave devices 12 are connected to the master device 10 through the network 3. The network 3 includes wireless LAN such as Wi-Fi. A medium quality audio signal is transmitted from the master device 10 to the slave devices 12. The master device 10 transmits the audio signal in a unicast method (TCP, for example) that performs retransmission control to the slave devices 12 in order to ensure the medium sound quality. While two slave devices 12 are illustrated in FIG. 1, one master device 10 is able to be connected to nine slave devices 12. In the preferred embodiment, a high quality audio signal may be a 192 kbps/24 bit signal, for example, and a medium quality audio signal may be a 48 kbps/16 bit signal, for example.

The audio source 2 is supplied from, for example, a DLNA (registered trademark) server or USB connected storage media (such as a hard disk or semiconductor memory). The file format of a supplied audio source 2 may be a FLAC (Free Lossless Audio Codec) file, for example, and satisfies the conditions of a high quality audio signal (192 kbps/24 bit).

FIG. 2 is a block diagram of a receiver being the master device 10. The master device 10 is provided with a control portion 20, a decoder 21, a sampling rate converter (SRC) 22, buffers 23 and 24, a signal output interface 25 (first output interface), and a wireless LAN communication interface 26 (second output interface). The control portion 20 controls the whole device according to a command of the controller 4. The control portion 20 is implemented by a CPU. The control portion 20 controls each portion of the master device 10 by reading a program stored in a storage medium such as a flash memory, to a work memory (RAM), and executing the program. The decoder 21 inputs an audio source 2 (such as a FLAC file) and decodes the audio source 2 to a streaming audio signal. The decoder 21 corresponds to a signal input interface that inputs an audio signal.

The streaming audio signal is a high quality signal (192 kbps/24 bit). The audio signal that has been decoded is input to the buffer 23, and is also input to the sampling rate converter 22. The sampling rate converter 22 converts an input high quality audio signal (192 kbps/24 bit) into a medium quality audio signal (48 kbps/16 bit). The audio signal that has been converted is input to the buffer 24. It is to be noted that the sampling rate converter 22 is not an essential configuration.

Figure 3A:
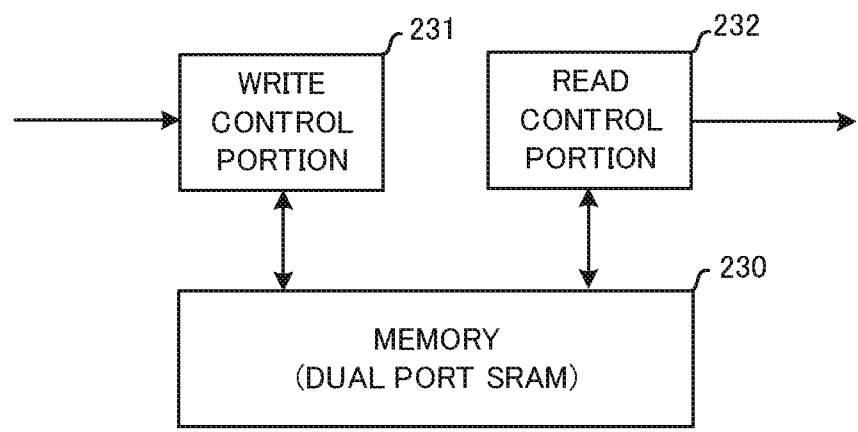
FIG. 3A is a configuration diagram of a buffer of the master device.
Figure 3B:
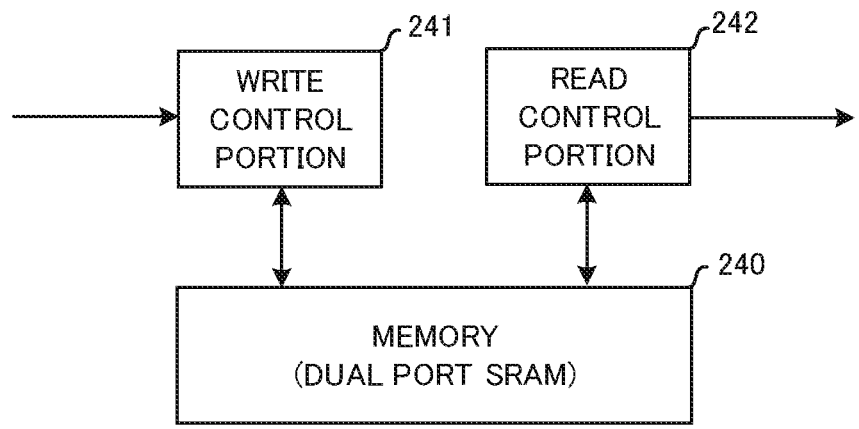
FIG. 3B is a configuration diagram of a buffer different from the buffer of FIG. 3A.

FIG. 3A is a block diagram illustrating a configuration of the buffer 23. FIG. 3B is a block diagram illustrating a configuration of the buffer 24. The buffer 23 has a memory (a first memory) 230, a write control portion 231, and a read control portion 232. The buffer 24 has a memory (a second memory) 240, a write control portion 241, and a read control portion 242. The memory 230 and the memory 240 may be dual port SRAM.

The write control portion 231 and the read control portion 232 correspond to a first buffer control portion. The write control portion 241 and the read control portion 242 correspond to a second buffer control portion. It is to be noted that, in the present preferred embodiment, the buffer 23 is provided with the write control portion 231 and the read control portion 232 while the buffer 24 is provided with the write control portion 241 and the read control portion 242. However, the control portion 20 to be mainly implemented by a CPU may implement the functions of the write control portion 231, the read control portion 232, the write control portion 241, and the read control portion 242. In such a case, the flash memory stores a program that causes the control portion 20 to implement the functions of the write control portion 231, the read control portion 232, the write control portion 241, and the read control portion 242.

The first buffer control portion, and the second buffer control portion are executed by a processing circuit, such as a CPU (Central Processing Unit) or a DSP (Digital Signal Processing).

The write control portion 231 writes an audio signal from the first port of the memory 230 in the memory 230. The read control portion 232 reads the audio signal that has been written in the memory 230 from the second port of the memory 230. The write control portion 241 writes an audio signal from the first port of the memory 240 to the memory 240. The read control portion 242 reads the audio signal that has been written in the memory 240 from the second port of the memory 240. The details of writing and reading procedures will be described below with reference to FIG. 4A, FIG. 4B, FIG. 4C, and FIG. 4D.

The signal output interface 25 outputs the high quality audio signal that has been read from the buffer 23, toward the powered speaker 11. The signal output interface 25 and the powered speaker 11 are connected to each other by a digital cable and are able to perform high speed and high quality signal transmission without delay.

The wireless LAN communication interface 26 sends the medium quality audio signal that has been read from the buffer 24, to the slave devices 12 through the network 3 (wireless LAN). Since communication with the slave devices 12 is performed by unicast as described above, the wireless LAN communication interface 26 sends the audio signal to each of the slave devices 12, to the network 3. Therefore, a time lag occurs between the transmission of an audio signal to the slave devices 12 through the network 3 (input timing of an audio signal to the slave devices 12) and the transmission of an audio signal to the powered speaker 11 through the digital cable (input timing of an audio signal to the powered speaker 11). The input timing of an audio signal to the powered speaker 11 is delayed behind the input timing of an audio signal to the slave devices 12 (a delay occurs). The buffer 23 and the buffer 24 absorb the delay, and enable synchronous reproduction by the powered speaker 11 and the slave devices 12.

In order that the buffer 23 buffers a high quality audio signal, the memory 230 has a large capacity. The memory 240 of the buffer 24 is set to a capacity suited for sound quality. An audio signal to be input from the decoder 21 to the buffer 23 and an audio signal to be input from the sampling rate converter 22 to the buffer 24 are input in parallel at the same time. Since the processing speed of the decoder 21 and the sampling rate converter 22 is faster than the reproduction speed of an audio signal, the decoder 21 and the sampling rate converter 22 operate properly according to the buffer amount of the buffer 23 and the buffer 24. For example, when the buffer amount is decreased, the write control portion 231 and the write control portion 241 respectively output a buffer underrun warning to the decoder 21 and the sampling rate converter 22. The decoder 21 and the sampling rate converter 22, when receiving the buffer underrun warning, repeat processing. The read control portion 232 and the read control portion 242 read an audio signal from the memory 230 and the memory 240 at the reproduction speed of the audio signal, and then respectively output the audio signal to the signal output interface 25 and the wireless LAN communication interface 26 in the following stage. It is to be noted that the amount of data read per unit time from each of the buffer 23 and the buffer 24 and the amount of data required for reproduction per unit time are different depending on the bit rate of an audio signal, a quantization bit rate, and the like. Therefore, the write control portion 231, the write control portion 241, the read control portion 232, and the read control portion 242 each require different write/read pointer control in consideration of the difference of the bit rate of an audio signal, a quantization bit rate, and the like.

Figure 4A:
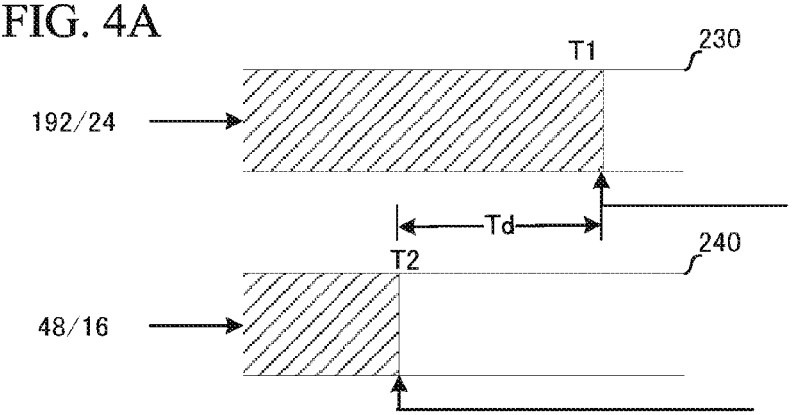
FIG. 4A is a diagram illustrating a basic form of a buffer reading method.

FIG. 4A, FIG. 4B, FIG. 4C, and FIG. 4D are diagrams each illustrating a reading method of an audio signal that is buffered by the buffer 23 and the buffer 24. FIG. 4A illustrates a basic form of the reading method. In the upper diagram of FIG. 4A, the read control portion 232 of the buffer 23 reads the audio signal of time T1 (a first reading position T1). The signal transmission system (channel A) from the signal output interface 25 to the powered speaker 11 has nearly no delay. Accordingly, time T1 corresponds to nearly a reproduction position of a current audio signal. In other words, at time T1, the audio signal positioned in the first reading position T1 is emitted and reproduced.

On the other hand, in the lower diagram of FIG. 4A, the read control portion 242 of the buffer 24 reads an audio signal of time T2 (a second reading position T2) that precedes (is reproduced later) time T1 by delay time Td. The signal transmission system (channel B) from the wireless LAN communication interface 26 to the slave devices 12 is delayed behind the channel A. Therefore, the read control portion 242 reads an audio signal that has preceded time T1 by the delay time Td, from the buffer 24, and sends the audio signal to the slave devices 12. Accordingly, the audio signal that has been synchronized by the powered speaker 11 and the slave devices 12 is able to be reproduced. In such a case, after time T2, audio signals after a position of the second reading position (time) T2 of the buffer 23 are thus reproduced together in the channel A and the channel B. Delay occurs mainly due to congestion of wireless LAN, retransmission control, and the throughput of inexpensive slave devices 12. During synchronous reproduction, each data buffer amount of the buffer 23 and the buffer 24 varies by the intermittent operation of the decoder 21 and the sampling rate converter 22. However, during such synchronous reproduction, a state in which a time lag between the first reading position T1 and the second reading position T2 is the delay time Td is maintained, and reading is continued.

Figure 4B:
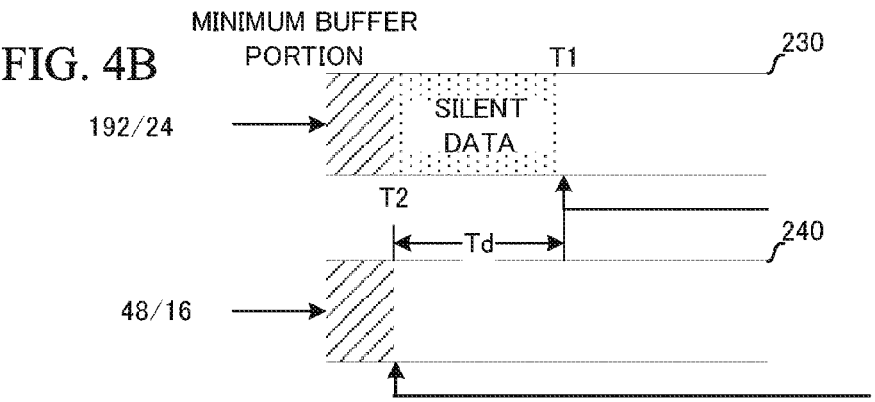
FIG. 4B is a diagram illustrating a buffer reading method different from the buffer reading method of FIG. 4A.
Figure 5:
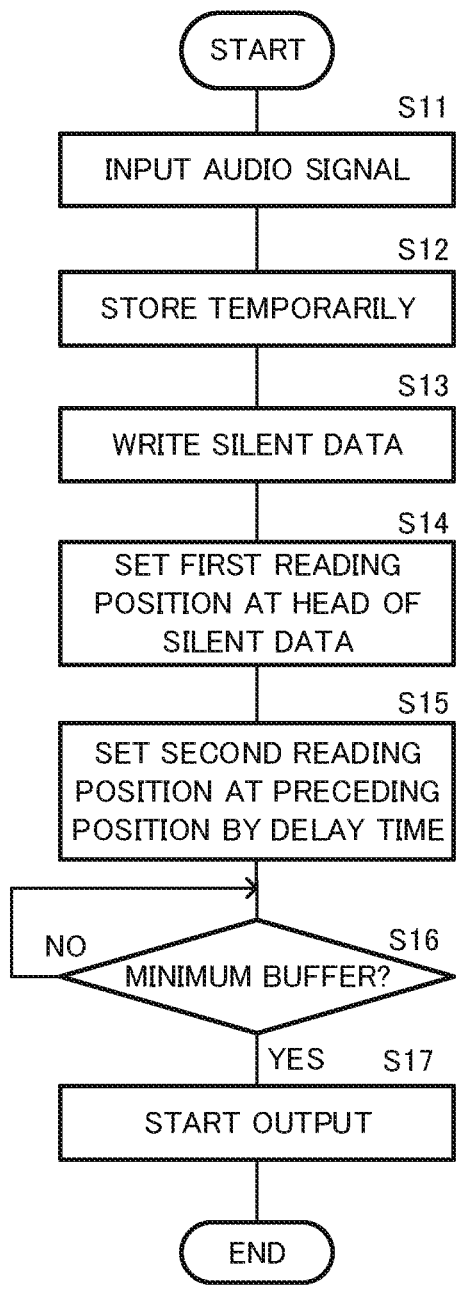
FIG. 5 is a flow chart showing an operation of an audio device.

FIG. 4B is a diagram illustrating processing at a start time of synchronous reproduction. FIG. 5 is a flow chart showing a flow of the processing illustrated in FIG. 4B. The processing of FIG. 4B is performed when the powered speaker 11 and the slave devices 12 perform synchronous reproduction from the start time (beginning of music, for example) of the reproduction of the audio source 2. In other words, the processing of FIG. 4B is performed when the output of an audio signal is started.

To begin with, the decoder 21 inputs an audio signal (S11). The write control portion 231 and the write control portion 241 write the audio signal in the memory 230 and the memory 240, respectively, and cause the buffer 23 and the buffer 24 to temporarily store the audio signal (S12).

The write control portion 231 writes silent data (zero data) for delay time Td (zero data) in the buffer 23 of the channel A in advance of reproduction start (S13). This is because, at the beginning of music, in other words, at a time of no previous audio signal, the first reading position T1 of the channel A is caused to synchronize with a position that goes back from the second reading position T2 of the channel B by the delay time Td.

The read control portion 232 sets the first reading position T1 to the head of the silent data (S14). Then, the read control portion 242 sets the second reading position T2 at a position that precedes the first reading position T1 by the delay time Td (S15).

The read control portion 232 and the read control portion 242 determine whether or not the minimum audio signal required for reproduction start thereafter is buffered (S16). The read control portion 232, when determining that the minimum audio signal has been buffered, reads silent data from the first reading position T1. In the buffer 24 of the channel B, the read control portion 242 starts reading from the head of an audio signal. Accordingly, an audio signal is output both from the signal output interface 25 being the first output interface and the wireless LAN communication interface 26 being the second output interface (S17). In the buffer 23 of the channel A, the read control portion 232 starts reading from the head of the silent data that goes back therefrom by the delay time Td. The powered speaker 11 of the channel A reproduces the head of an actual audio signal after reproducing the silent data for the delay time Td. In addition, the slave devices 12 start reproducing with delay by the delay time Td due to the difference in transmission rate from the channel A and the difference in reproduction ability from the powered speaker 11. Accordingly, the powered speaker 11 and the slave devices 12 perform synchronous reproduction thereafter.

Figure 4C:
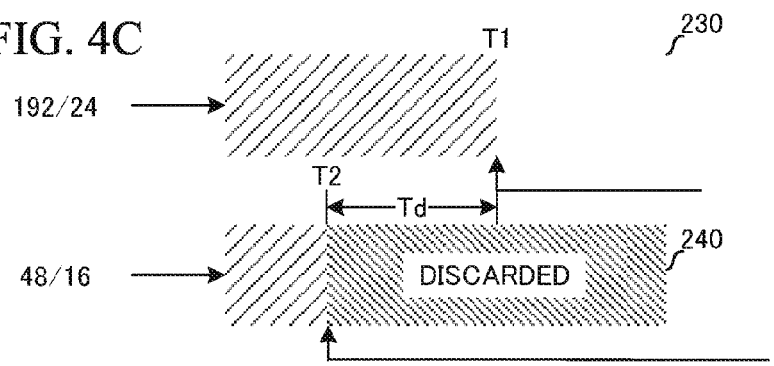
FIG. 4C is a diagram illustrating a buffer reading method different from the buffer reading methods of both FIG. 4A and FIG. 4B.
Figure 4D:
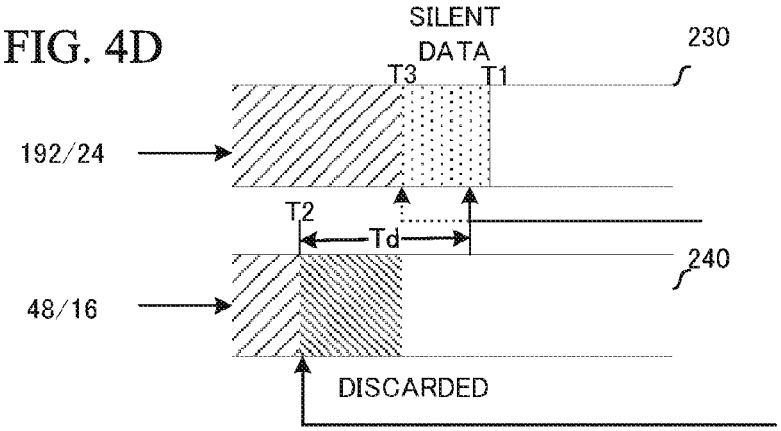
FIG. 4D is a diagram illustrating a buffer reading method different from the buffer reading methods of all of FIG. 4A, FIG. 4B, and FIG. 4C.
Figure 6:
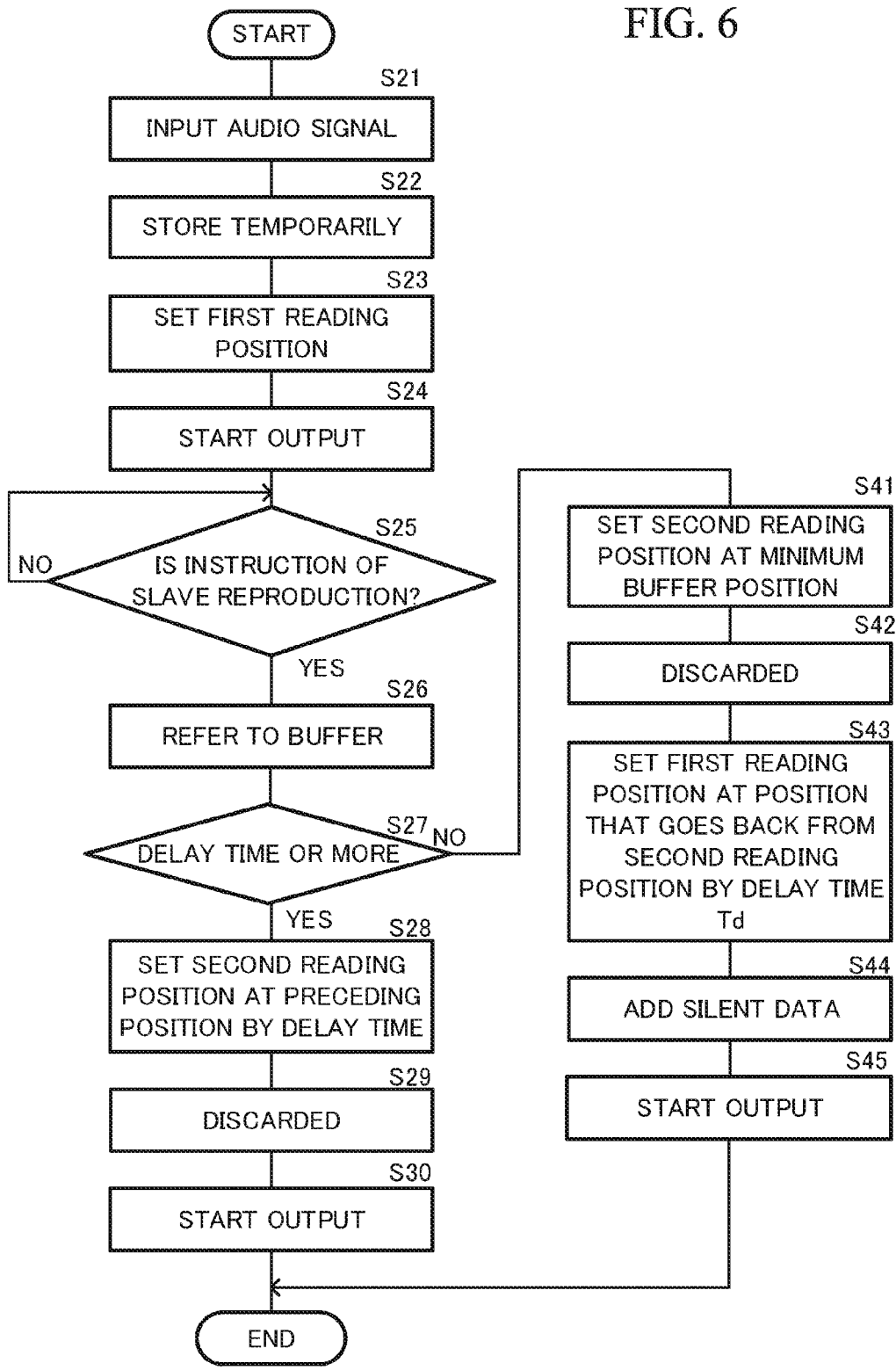
FIG. 6 is a flow chart showing an operation of an audio device.

FIG. 4C and FIG. 4D illustrate processing in a case in which synchronous reproduction of the slave devices 12 (channel B) is caused to start in the middle while the powered speaker 11 (channel A) reproduces an audio signal. FIG. 6 is a flow chart showing the flow of processing of FIG. 4C and FIG. 4D. In the processing of FIG. 4C and FIG. 4D, while the read control portion 232 causes the signal output interface 25 to read an audio signal from the buffer 23, the read control portion 242 causes the wireless LAN communication interface 26 to newly read an audio signal from the buffer 24. FIG. 4C illustrates a reading form in a case in which the buffer amount of the buffer 23 and the buffer 24 is equal to or more than the delay time and synchronous reproduction by the slave devices 12 is able to be started while the reproduction by the powered speaker 11 continues. FIG. 4D illustrates a reading form in a case in which the buffer amount of the buffer 23 and the buffer 24 is less than the delay time and the powered speaker 11 temporarily stops reproduction to start reproducing in synchronization with the slave devices 12.

The decoder 21 inputs an audio signal (S21). The write control portion 231 and the write control portion 241 write the audio signal in the memory 230 and the memory 240, respectively, and cause the buffer 23 and the buffer 24 to temporarily store the audio signal (S22). Even when reproduction by the slave devices 12 is not performed, the audio signal is continuously written in the buffer 24 from the sampling rate converter 22. Further, a buffered audio signal is not read and is thrown away (overwritten) in order from the oldest audio signal.

The read control portion 232 sets the first reading position T1 (S23), and outputs an audio signal from the signal output interface 25 being the first output interface (S24). The first reading position T1 here is set at the head of the buffered audio signal. However, the audio signal is output when data for the minimum buffer required for at least reproduction start is buffered in the memory 230.

If an instruction of reproduction by the slave devices 12 is input from the controller 4 while the signal output interface 25 outputs an audio signal toward the powered speaker 11 (S25), the control portion 20 refers to the buffer amount of the buffer 23 and the buffer 24 (S26). Then, the control portion 20 determines whether or not the buffer amount of the buffer 23 and the buffer 24 is equal to or more than the delay time (S27). If the buffer amount of the buffer 23 and the buffer 24 is equal to or more than the delay time, the read control portion 242 performs processing from step S28 to step S30. If the buffer amount of the buffer 23 and the buffer 24 is less than the delay time, the write control portion 231, the read control portion 232, and the read control portion 242 perform processing from step S41 to step S45.

To begin with, in the processing of step S28, the read control portion 242, as illustrated in FIG. 4C, refers to the first reading position T1 of the buffer 23 at that time and sets the second reading position T2 at a position that precedes from the first reading position T1 by the delay time Td. In addition, the read control portion 242 discards the buffer data of the buffer 24 before the second reading position T2 (S29). The audio signal that has been read from the buffer 24 is sent to the slave devices 12 through the network 3 (S30). Accordingly, the reproduction sound of the powered speaker 11 is not interrupted and synchronous reproduction is started in the middle (after time T2) in the slave devices 12.

On the other hand, the read control portion 242, in the case of being unable to ensure the minimum buffer if causing a reading position T3 of the buffer 23 at that time to precede in the buffer 24 by the delay time Td, sets the second reading position T2 of the buffer 24 at the minimum buffer position being the most preceding position of the audio signal in the buffer 24 (S41). In addition, the read control portion 242 discards the buffer data of the buffer 24 before the second reading position T2 (S42).

Then, the first reading position T1 of the buffer 23 is set at a position that goes back from the second reading position T2 by the delay time Td (S43). However, the first reading position T1 is a past position prior to a current reading position T3, and the audio signal of the past position has been already read. Accordingly, the write control portion 231 adds silent data from the first reading position before movement (the current reading position T3) to the first reading position T1 that has been moved this time (S44).

Then, the read control portion 232 and the read control portion 242 simultaneously start reading an audio signal each from the first reading position T1 and the second reading position T2 of the buffer 23 and the buffer 24 (S45). Thus, the silent data is read first for a short time in the buffer 23, and sound is interrupted for a short time in the powered speaker 11. Subsequently, the audio signal that corresponds to time of the reading position T3 to the second reading position T2 by the powered speaker 11 is reproduced independently, and, after the time of the second reading position T2, is started reproducing synchronously by the powered speaker 11 and the slave devices 12.

The delay time Td may be previously set in the master device 10 at the time of shipment from a factory. Alternatively, the delay time Td may be set with a controller 4 by a user estimating a synchronous lag while listening to reproduction sound. In addition, in a case in which the master device 10 and the slave devices 12 are synchronized with each other with respect to internal time, the delay time Td may not be set with high precision as long as the reproduction time (absolute time) of an audio signal is added with a time stamp.

In the above preferred embodiment of the present invention, as long as the bit rate of the channel A and the channel B and a quantization bit rate are the same, the number of buffers may be one. In such a case, the buffer control portion (read control portion) may cause the channel A and the channel B to read buffer data from a separate address.

While, in the above preferred embodiment of the present invention, the powered speaker 11 is connected to the master device 10 by the digital cable, the powered speaker 11 as well as the slave devices 12 (as one of the slave apparatus 12) may be connected to the master device 10 through the network 3.

While, in FIG. 4D, when the buffer amount of the buffer 23 and the buffer 24 is insufficient, silent data is written in the buffer 23, synchronous reproduction may be started after the decoder 21 and the sampling rate converter 22 are started to make the buffer amount of an audio signal necessary and sufficient (after being a state in FIG. 4C).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An audio device comprising:
    a signal input interface configured to input an audio signal;
    a first output interface;
    a second output interface;
    at least one processing circuit configured as a buffer control portion; and
    at least one memory configured to store the audio signal and instruction that, when executed by the at least one processing circuit, wherein:
    the buffer control portion sets a first reading position being a reading position of the audio signal stored in the memory with respect to the first output interface, a second reading position being a reading position of the audio signal stored in the memory with respect to the second output interface, and a minimum buffer position being a most preceding position of the audio signal in the memory; and
    in a case in which, in a middle of reading the audio signal from the memory to the first output interface, the audio signal is newly read from the memory to the second output interface, when a buffer amount of the memory is equal to or more than delay time, the buffer control portion sets the second reading position at a position that precedes the first reading position by the delay time, and, when the buffer amount of the memory is less than the delay time, the buffer control portion sets the second reading position at the minimum buffer position, moves the first reading position to a position that goes back from the minimum buffer position by the delay time, and writes silent data for time of movement from the first reading position before the movement to the first reading position after the movement.

2. The audio device according to claim 1, wherein the memory includes:
    a first memory; and
    a second memory;
    the at least one processing circuit is further configured to:

write the audio signal in the first memory and the second memory; and
read the audio signal from the memory;
the first reading position is set in the first memory; and
the second reading position is set in the second memory.

3. The audio device according to claim 2, wherein the at least one processing circuit is further configured to discard the audio signal before the second reading position in the second memory.

4. An audio system comprising:
the audio device according to claim 1;
a first reproducing device configured to reproduce the audio signal that is output from the first output interface; and
a second reproducing device configured to reproduce the audio signal that is output from the second output interface, wherein the delay time corresponds to a time lag between input of the audio signal to the first reproducing device and input of the audio signal to the second reproducing device.

5. The audio system according to claim 4, wherein a transmission system from the first output interface to the first reproducing device and a transmission system from the second output interface to the second reproducing device have different transmission rates.

* * * * *

UNITED STATES PATENT AND TRADEMARK OFFICE
CERTIFICATE OF CORRECTION

| | | |
|---|---|---|
| PATENT NO. | : 10,080,207 B2 | Page 1 of 1 |
| APPLICATION NO. | : 15/686556 | |
| DATED | : September 18, 2018 | |
| INVENTOR(S) | : Katsuaki Tanaka et al. | |

It is certified that error appears in the above-identified patent and that said Letters Patent is hereby corrected as shown below:

On the Title Page

Under Item (56) References Cited, list the following Foreign References:
JP 2006074374 A 03/2006
JP 2011066544 A 03/2011
JP 2014072614 A 04/2014

Under Item (56) References Cited, list the following Other Publications:
International Search Report issued in Intl. Appln. No. PCT/JP2016/067608 mailed September 6, 2016.
English translation provided.
Written Opinion issued in Intl. Appln. No. PCT/JP2016/067608 mailed September 6, 2016.

Signed and Sealed this
Fourth Day of December, 2018

Andrei Iancu
*Director of the United States Patent and Trademark Office*